United States Patent
Yang et al.

(10) Patent No.: US 12,352,880 B2
(45) Date of Patent: Jul. 8, 2025

(54) SPATIAL POSITIONING METHOD

(71) Applicant: PSJ INTERNATIONAL LTD., Tortola (VG)

(72) Inventors: Tzu-Yi Yang, Taoyuan (TW);
Meng-Lin Yu, Kaohsiung (TW);
Ju-Chin Chao, New Taipei (TW);
Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 337 days.

(21) Appl. No.: 18/161,082

(22) Filed: Jan. 29, 2023

(65) Prior Publication Data
US 2024/0036154 A1 Feb. 1, 2024

(30) Foreign Application Priority Data
Jul. 27, 2022 (TW) .................................. 111128082

(51) Int. Cl.
*G01S 5/02* (2010.01)
*H04W 64/00* (2009.01)

(52) U.S. Cl.
CPC ........ *G01S 5/02955* (2020.05); *G01S 5/0242* (2013.01); *H04W 64/003* (2013.01); *G01S 2205/02* (2020.05)

(58) Field of Classification Search
CPC . G01S 5/02955; G01S 5/0242; H04W 63/003
USPC .......................................................... 342/451
See application file for complete search history.

(56) References Cited

U.S. PATENT DOCUMENTS

2024/0267095 A1 * 8/2024 Kudo .................. H04B 7/0413

FOREIGN PATENT DOCUMENTS

| CN | 109982240 A |   | 7/2019 |            |
|----|-------------|---|--------|------------|
| CN | 114745684 A | * | 7/2022 | G06N 3/045 |
| TW | 201603976 A |   | 2/2016 |            |

* cited by examiner

Primary Examiner — Harry K Liu
(74) Attorney, Agent, or Firm — Li & Cai Intellectual Property Office (57) ABSTRACT

A spatial positioning method is provided. The method includes steps of: dividing an activity space into a plurality of activity regions; selecting a plurality of positions in the activity space or within a distance range of the activity space as a plurality of base station candidate positions; predicting connection states between the plurality of base stations that are disposed respectively at the plurality of station candidate positions and a mobile robot moving to each of the plurality of activity regions; selecting some of the base station candidate positions as a plurality of base station positions according to the connection states; disposing the plurality of base stations respectively at the plurality of base station positions; and wirelessly connecting the mobile robot respectively moving to the plurality of activity regions to some of the plurality of base stations to position the mobile robot.

8 Claims, 7 Drawing Sheets

SPATIAL POSITIONING METHOD

CROSS-REFERENCE TO RELATED PATENT APPLICATION

This application claims the benefit of priority to Taiwan Patent Application No. 111128082, filed on Jul. 27, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a spatial positioning method, and more particularly to a spatial positioning method that is applicable to an indoor space.

BACKGROUND OF THE DISCLOSURE

Global positioning systems (GPS), pedometers and electronic compasses are often used in conventional indoor positioning technology. However, such conventional positioning technology often suffers from various problems and limitations, such as the signals being received having poor signal strength due to signal interference or blocking. As a result, these conventional technologies have poor positioning accuracy, and are thus hardly applicable in indoor spaces.

SUMMARY OF THE DISCLOSURE

In response to the above-referenced technical inadequacies, the present disclosure provides a spatial positioning method. The spatial positioning method includes the following steps: dividing an activity space into a plurality of activity regions; selecting a plurality of positions in the activity space or within a distance range of the activity space as a plurality of base station candidate positions; predicting connection states between a plurality of base stations that are disposed respectively at the plurality of station candidate positions and a mobile robot moving to each of the plurality of activity regions; selecting some of the plurality of base station candidate positions as a plurality of base station positions, according to the connection states between the plurality of base stations that are disposed respectively at the plurality of station candidate positions and the mobile robot moving to each of the plurality of activity regions; disposing the plurality of base stations at the plurality of base station positions, respectively; and wirelessly connecting the mobile robot moving to each of the plurality of activity regions to some of the plurality of base stations for positioning the mobile robot.

In certain embodiments, the spatial positioning method further includes the following steps: determining a score of each of the plurality of base station candidate positions, according to the connection states between the plurality of base stations that are disposed respectively at the plurality of station candidate positions and the mobile robot moving to each of the plurality of activity regions; and selecting some of the plurality of base station candidate positions as the plurality of base station positions, according to the scores of the plurality of base candidate positions.

In certain embodiments, the spatial positioning method further includes the following step: determining whether or not the score of any one of the plurality of base station candidate positions is larger than a score threshold, in response to determining that the score of the one of the plurality of base station candidate positions is larger than the score threshold, selecting the one of the plurality of base station candidate positions as one of the plurality of base station positions, and in response to determining that the score of the one of the plurality of base station candidate positions is not larger than the score threshold, not selecting the one of the plurality of base station candidate positions as one of the plurality of base station positions.

In certain embodiments, the spatial positioning method further includes the following step: selecting some of the plurality of base station candidate positions that have higher ones of the scores of the plurality of base station candidate positions as the plurality of base station positions.

In certain embodiments, the spatial positioning method further includes the following steps: evaluating which ones of the plurality of activity regions are regions at which the mobile robot is wirelessly connected to the base station at a same one of the plurality of base station candidate positions; calculating a number of the plurality of base stations that are wirelessly connected to the mobile robot moving to each of the ones of the plurality of activity regions to determine the score of each of the plurality of base station candidate positions; and selecting some of the plurality of base station candidate positions as the plurality of base station positions, according to the scores of the plurality of base station candidate positions.

In certain embodiments, the spatial positioning method further includes the following steps: setting a plurality of weight values respectively corresponding to a plurality of reference connection numbers; evaluating which ones of the plurality of activity regions are regions at which the mobile robot is wirelessly connected to the base station at a same one of the plurality of base station candidate positions; calculating a number of the plurality of base stations that are wirelessly connected to the mobile robot moving to each of the ones of the plurality of activity regions as a previous connection number; looking up one of the plurality of reference connection numbers that is equal to the previous connection number to obtain one of the plurality of weight values corresponding to the one of the plurality of reference connection numbers; determining the score of each of the plurality of base station candidate positions according to the weight value of each of the plurality of activity regions; and selecting some of the plurality of base station candidate positions as the plurality of base station positions, according to the scores of the plurality of base station candidate positions.

In certain embodiments, the spatial positioning method further includes the following step: calculating a sum of the weight values of the activity regions at which the mobile robot is wirelessly connected to the base station at the same one of the plurality of base station candidate positions to determine the score of each of the base candidate positions.

In certain embodiments, the spatial positioning method further includes the following steps: calculating a number of the plurality of base stations that are wirelessly connected to the mobile robot at each of the plurality of activity regions, as a previous connection number; and determining whether or not the previous connection number of the mobile robot moving to each of the plurality of activity regions is larger than a number threshold, in responding to determining that the previous connection number of the mobile robot moving to each of the plurality of activity regions is not larger than the number threshold, reselecting the plurality of base station positions, and in responding to determining that the previous connection number of the mobile robot moving to each of the plurality of activity regions is larger than the number threshold, not reselecting the plurality of base station positions.

In certain embodiments, the spatial positioning method further includes the following step: setting the number threshold to be larger than three.

In certain embodiments, the spatial positioning method further includes the following steps: calculating a number of the plurality of base stations that are wirelessly connected to the mobile robot at each of the plurality of activity regions, as a previous connection number; and determining whether or not the previous connection number of the mobile robot moving to each of the plurality of activity regions is larger than a number threshold, in responding to determining that the previous connection number of the mobile robot moving to each of the plurality of activity regions is not larger than the number threshold, updating the spatial state information of the activity space and reselecting the plurality of base station positions according to the spatial state information that is updated, and in responding to determining that the previous connection number of the mobile robot moving to each of the plurality of activity regions is larger than the number threshold, not reselecting the plurality of base station positions.

As described above, the present disclosure provides the spatial positioning method. In the spatial positioning method of the present disclosure, the connection states between the plurality of base stations that are disposed respectively at the plurality of station candidate positions and a mobile robot moving to each of the plurality of activity regions are predicted to select some of the plurality of base station candidate positions as the base station positions. The base stations are disposed are respectively at the selected base station positions. As a result, whenever the mobile robot (e.g., for delivering food) moves to any position in the activity space (in particular, an indoor space in which furnishing that may obstruct signal transmission of the base station signals are arranged), the mobile robot is able to be positioned according to the base station signals by using the spatial positioning method of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
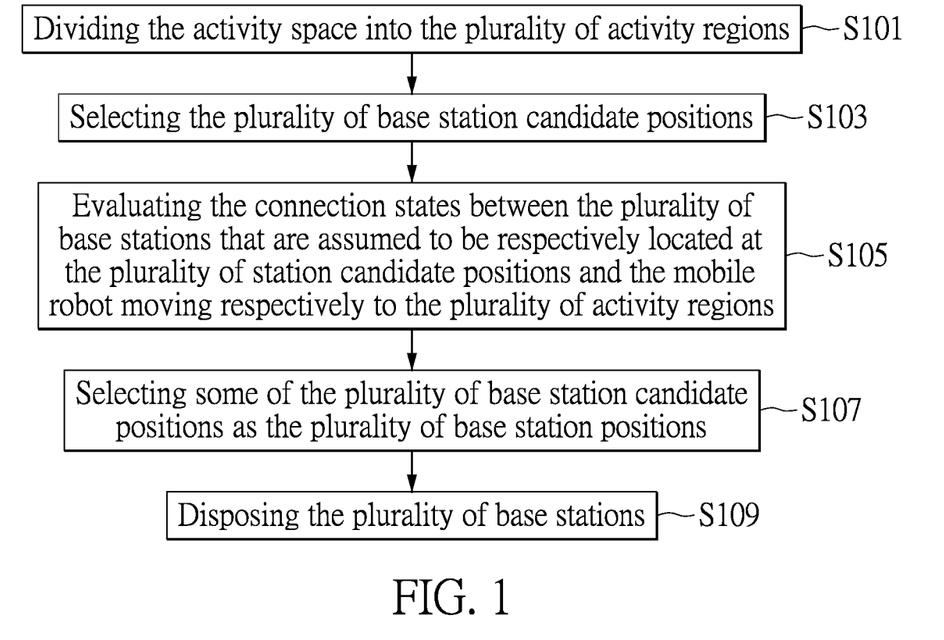
FIG. 1 is a flowchart diagram of steps of a spatial positioning method including selecting base station positions based on connection states between base stations disposed respectively at base station candidate positions and a mobile robot moving to each of activity regions according to an embodiment of the present disclosure.
Figure 5:
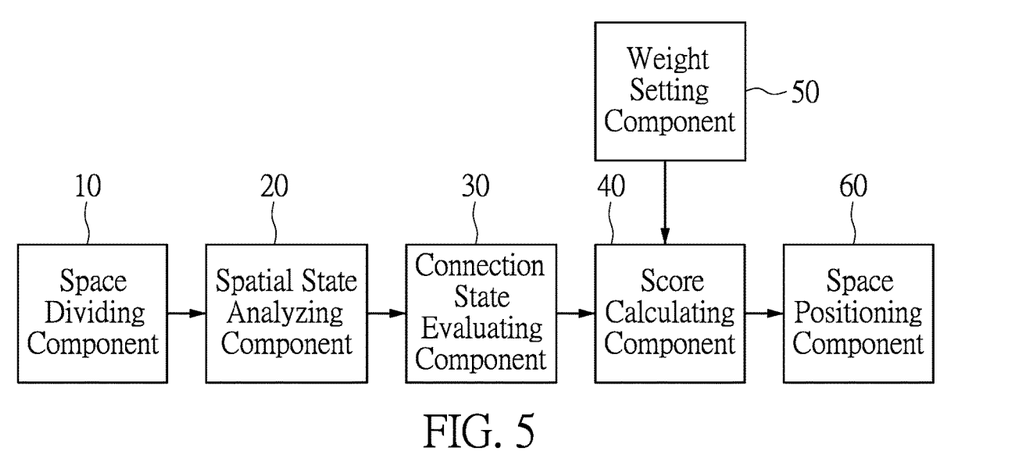
FIG. 5 is a block diagram of a spatial positioning system according to the embodiment of the present disclosure.
Figure 6:
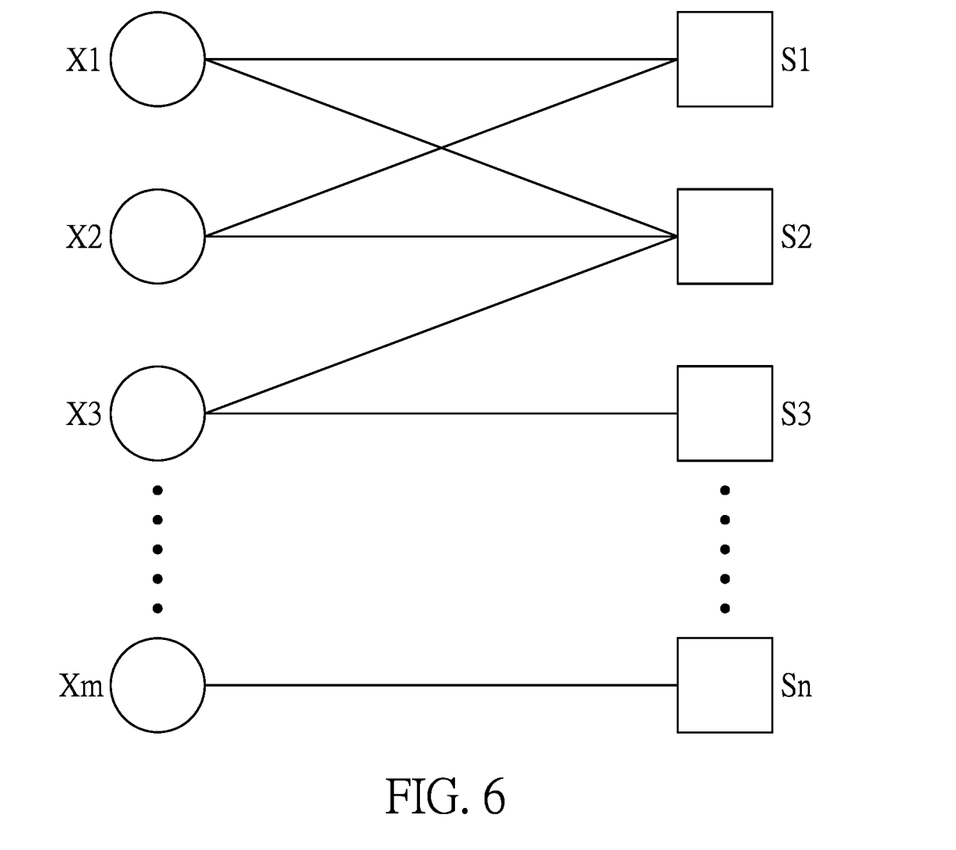
FIG. 6 is a schematic diagram of the connection states between the base stations disposed respectively at base station candidate positions and the mobile robot moving to each of activity regions according to the spatial positioning method of the embodiment of the present disclosure.

Reference is made to FIGS. 1, 5 and 6, in which FIG. 1 is a flowchart diagram of steps of selecting base station positions based on connection states between base stations disposed respectively at base station candidate positions and a mobile robot moving to each of activity regions according to a spatial positioning method of an embodiment of the present disclosure, FIG. 5 is a block diagram of a spatial positioning system according to the embodiment of the present disclosure, and FIG. 6 is a schematic diagram of the connection states between the base stations disposed respectively at base station candidate positions and the mobile robot moving to each of activity regions according to the spatial positioning method of the embodiment of the present disclosure.

The spatial positioning method of the embodiment of the present disclosure is applicable to one or more mobile robots such as, but not limited to, mobile robots for food delivery. The spatial positioning method includes steps S101 to S109 as shown in FIG. 1. The steps S101 to S109 as shown in FIG. 1 may be performed by the spatial positioning system as shown in FIG. 5.

As shown in FIG. 5, the spatial positioning system may include a space dividing component 10, a spatial state analyzing component 20, a connection state evaluating component 30, a score calculating component 40, a weight setting component 50, and a space positioning component 60. The spatial state analyzing component 20 may be connected to the space dividing component 10 and the connection state evaluating component 30. The score calculating component 40 may be connected to the connection state evaluating component 30, the weight setting component 50 and the space positioning component 60.

In step S101, the space dividing component 10 divides an activity space of the mobile robot into a plurality of activity regions such as a plurality of activity regions S1 to Sn as shown in FIG. 6. The plurality of activity regions S1 to Sn may be spaced apart from each other or not spaced apart from each other, but the present disclosure is not limited thereto.

In step S103, the space dividing component 10 selects a plurality of positions in the activity space of the mobile robot or within a distance range of the activity space of the mobile robot, as a plurality of base station candidate positions, such as a plurality of base station candidate positions X1 to Xm as shown in FIG. 6. It should be understood that, the number and sizes of the activity regions divided from the activity space of the mobile robot, the number of the base station candidate positions, coordinate positions of the base station candidate positions, relative positions of the base station candidate positions relative to decorations or other objects in the activity space may be determined according to actual requirements, and the present disclosure is not limited thereto.

In step S105, the spatial state analyzing component 20 analyzes spatial state information of the activity space of the mobile robot. The spatial state information may include an area of the activity space, distances and obstacles between the plurality of base station candidate positions X1 to Xm and the plurality of activity regions S1 to Sn, the number and distribution of the plurality of base station candidate positions X1 to Xm, the number and distribution of the plurality of activity regions S1 to Sn, and signal strengths of a plurality of base station signals that are emitted respectively by signal transmitters of the plurality of base stations.

The connection state evaluating component 30, according to the spatial state information of the activity space of the mobile robot, predicts connection states between the base stations that are disposed respectively at the plurality of station candidate positions X1 to Xm and the mobile robot moving to each of the plurality of activity regions S1 to Sn.

In step S107, the space positioning component 60, according to the connection states between the base stations that are disposed respectively at the plurality of station candidate positions X1 to Xm and the mobile robot moving to each of the plurality of activity regions S1 to Sn, selects some of the plurality of base station candidate positions X1 to Xm as the plurality of base station positions.

In step S109, the plurality of base stations are disposed at the plurality of base station positions selected by the space positioning component 60. The signal transmitter is disposed at each of the plurality of base stations and is configured to emit the base station signal. The mobile robot receives the base station signals from the base stations (and outputs feedback signals to the base stations according to the base station signals). The mobile robot is positioned in the activity space according to the base station signals (and the feedback signals).

The mobile robot may obtain source information of the received based station signals (that indicates positions of the base stations emitting the based station signals). The mobile robot may calculate or obtain a signal strength difference between each of the plurality of based station signal emitted by the plurality of base stations and each of the plurality of based station signal received by the mobile robot. The mobile robot may calculate or obtain a time difference between a time point at which the signal transmitter of the base station emits the base station signal and a time point at which a signal receiver of the mobile robot receives the base station signal. For example, the mobile robot may, according to the source information, the strength difference and the time difference as described above, calculate a distance between the mobile robot and each of the plurality of base stations to determine a relative position or an absolute position of the mobile robot in the activity space. Alternatively, after the mobile robot receives the base station signal from the base station, the mobile robot may output the feedback signal to a signal receiver of the base station according to the base station signal, and then the base station or a central control device positions the mobile robot according to the feedback signal.

Figure 2:
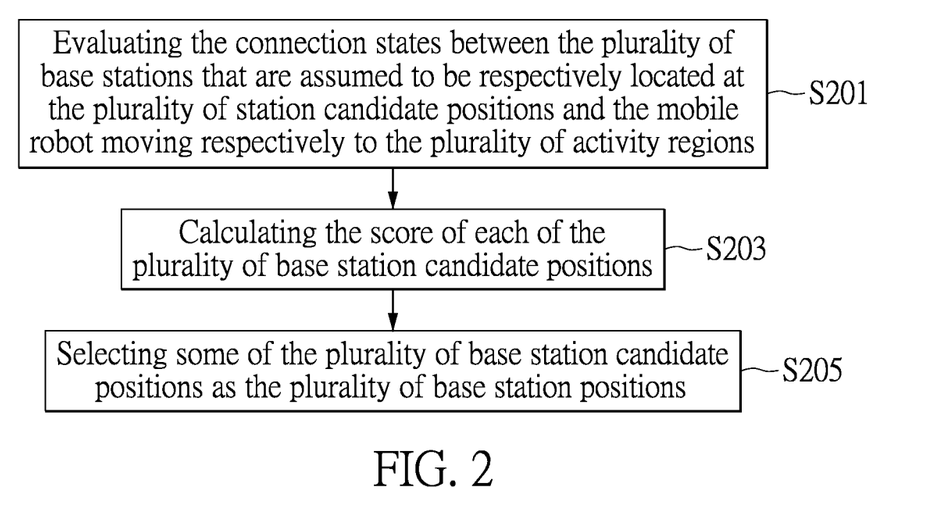
FIG. 2 is a flowchart diagram of steps of the spatial positioning method including scoring the base station candidate positions based on the connection states between the base stations disposed respectively at the station candidate positions and the mobile robot moving to each of the plurality of activity regions to select the base station positions according to the embodiment of the present disclosure.

Reference is made to FIGS. 2, 5 and 6, in which FIG. 2 is a flowchart diagram of steps of scoring the base station candidate positions based on the connection states between the base stations disposed respectively at the station candidate positions and the mobile robot moving to each of the plurality of activity regions to select some of the base station candidate positions as the base station positions according to the embodiment of the present disclosure.

The spatial positioning method of the embodiment of the present disclosure may include steps S201 to S205 as shown in FIG. 2. The S201 to S205 as shown in FIG. 2 may be performed by the spatial positioning system as shown in FIG. 5.

In step S201, the connection state evaluating component 30 evaluates or determines the connection states between the base station at each of the plurality of base station candidate positions X1 to Xm and the mobile robot moving to each of the plurality of activity regions S1 to Sn.

In step S203, the score calculating component 40, according to the connection states between the base station at each of the base station candidate positions X1 to Xm and the mobile robot moving to each of the plurality of activity regions S1 to Sn, determines a score of each of the plurality of base station candidate positions X1 to Xm. For example, the larger the number of the activity regions S1 to Sn at which the mobile robot are wirelessly connected to the base station at the same one of the plurality of base station candidate positions X1 to Xm is, the higher the score of the same one of the plurality of base station candidate positions X1 to Xm is, but the present disclosure is not limited thereto.

In step S205, the space positioning component 60, according to the scores respectively of the plurality of base station candidate positions X1 to Xm, selects some of the plurality of base station candidate positions X1 to Xm as the plurality of base station positions. For example, among the plurality of base station candidate positions X1 to Xm, the base station candidate positions having the higher scores are selected as the plurality of base station positions, but the present disclosure is not limited thereto. The plurality of base stations are disposed respectively at the plurality of base station positions and used for positioning of the mobile robot.

Figure 3:
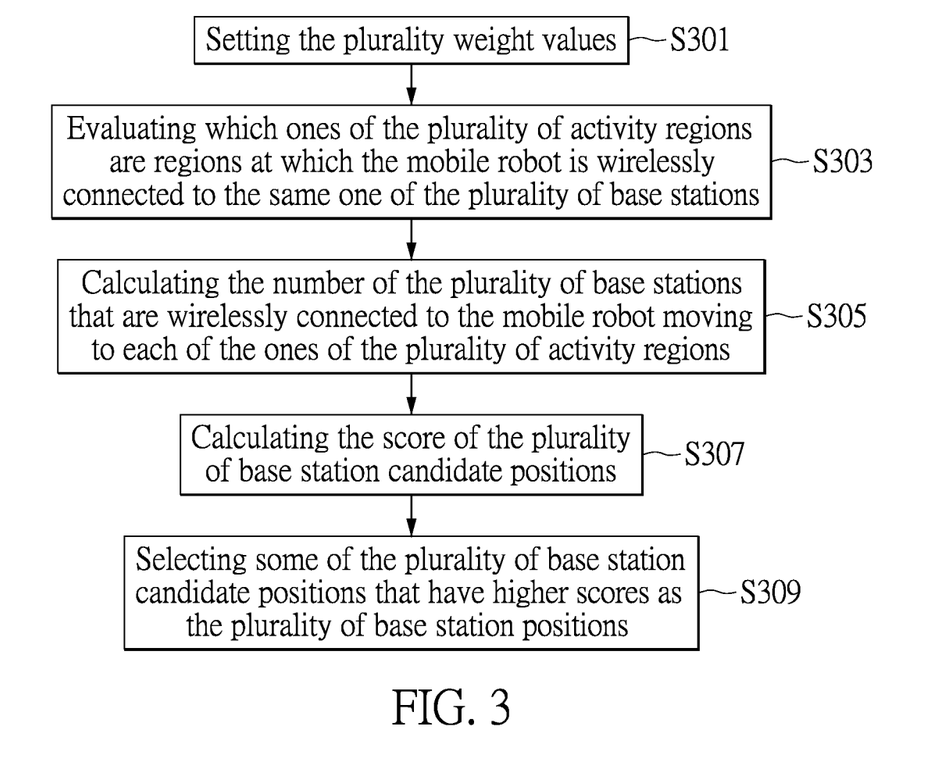
FIG. 3 is a flowchart diagram of steps of the spatial positioning method including calculating a sum of weight values of the activity regions at which the mobile robot is wirelessly connected to the same one of the base stations to select the base station positions according to the embodiment of the present disclosure.

Reference is made to FIGS. 3, 5 and 6, in which FIG. 3 is a flowchart diagram of steps of calculating a sum of weight values of the activity regions at which the mobile robot is wirelessly connected to the same one of the base stations to select the base station positions according to the embodiment of the present disclosure.

The spatial positioning method of the embodiment of the present disclosure may include steps S301 to S309 as shown in FIG. 3. The steps S301 to S309 as shown in FIG. 3 may be performed by the spatial positioning system as shown in FIG. 5.

In step S301, the weight setting component 50 sets a plurality of weight values. The plurality of weight values respectively correspond to a plurality of reference connection numbers. The reference connection numbers are different from each other. For example, the larger the reference connection number is, the smaller the weight value is, but the present disclosure is not limited thereto. In order words, the weight setting component 50 may set the plurality of weight values, according to the number of the base stations at the base station candidate positions that are wirelessly connected to the mobile robot moving to each of the plurality of activity regions. For example, the larger the number of the base stations wirelessly connected to the mobile robot moving to the activity region is, the smaller the weight value of the activity region is, but the present disclosure is not limited thereto.

In step S303, the connection state evaluating component 30 determines which ones of the plurality of activity regions are regions at which the mobile robot is wirelessly connected to the base station at the same one of the plurality of base station candidate positions.

In step S305, the score calculating component 40 calculates the number of the plurality of base stations that are wirelessly connected to the mobile robot moving to each of the ones of the plurality of activity regions. Then, the score calculating component 40 looks up one of the plurality of reference connection numbers that is equal to the number of the plurality of base stations wirelessly connected to the mobile robot moving to each of the ones of the plurality of activity regions. Then, the score calculating component 40 obtains one of the plurality of weight values corresponding to the one of the plurality of reference connection numbers.

In step S307, the score calculating component 40 performs an arithmetic operation on all of the weight values of the activity regions at which the mobile robot is wirelessly connected to the base station disposed at the same one of the plurality of station candidate positions. For example, the arithmetic operation may include an addition operation, a multiplication operation or other operations, but the present disclosure is not limited thereto.

For example, the plurality of weight values set by the weight setting component 50 may include a first weight value such as "1", a second weight value such as "0.3", a third weight value such as "0.1" and a fourth weight value such as "0". The weight value of the activity region is determined, according to a previous connection number that represents the number of the base stations at the base station candidate positions that are wirelessly connected to the mobile robot moving to the activity region (or represents the number of the base station signals received by the mobile robot moving to the activity region). If the previous connection number is equal to a first number such as "0", the weight value of the activity region is equal to the first weight value such as "1". If the previous connection number is equal to a second number such as "1", the weight value of the activity region is equal to the second weight value such as "0.3". If the previous connection number is equal to a third number such as "2", the weight value of the activity region is equal to the third weight value such as "0.1". If the previous connection number is equal to a fourth number such as "3", the weight value of the activity region is equal to the fourth weight value such as "0".

The above weight values and the previous connection number may be represented by the following equations:

$$G(Xm, Sn) = \begin{cases} 1, & k = 0 \\ 0.3, & k = 1 \\ 0.1, & k = 2 \\ 0, & k = 3 \end{cases}$$

where k represents the previous connection number.

As shown in FIG. 6, the base station at the base station candidate position X1 is wirelessly connected to the mobile robot moving to each of the activity region S1 and the activity region S2. At this time, the score of the base station candidate position X1 is equal to a sum "2" of the weight value "1" of the activity region S1 and the weight value "1" of the activity region S2.

Then, as shown in FIG. 6, the base station at the base station candidate position X2 is wirelessly connected to the mobile robot moving to each of the activity region S1 and the activity region S2. However, the mobile robot previously moving to the activity region S1 and the activity region S2 is wirelessly connected to the base station at the base station candidate position X1. That is, the previous connection number of the activity region S1 is one, and the previous connection number of the activity region S2 is one. Therefore, the score of the base station candidate position X2 is equal to a sum "0.6" of the weight value "0.3" of the activity region S1 and the weight value "0.3" of the activity region S2.

Then, as shown in FIG. 6, the base station at the base station candidate position X3 is wirelessly connected to the mobile robot moving to each of the activity region S2 and the activity region S3. However, the mobile robot previously moving to the activity region S2 is wirelessly connected to the base station at the base station candidate position X1 and the base station candidate position X2. That is, the previous connection number of the activity region S2 is two. Therefore, the weight value of the activity region S2 is "0.1". The previous connection number of the activity region S3 is zero. Therefore, the weight value of the activity region S3 is "1". Therefore, the score of the base station candidate position X3 is equal to a sum "1.1" of the weight value "0.1" of the activity region S2 and the weight value "1" of the activity region S3.

In step S309, the space positioning component 60 selects some of the plurality of base station candidate positions X1 to Xm as the plurality of base stations, according to the scores of the plurality of base station candidate positions X1 to Xm. For example, the space positioning component 60 selects some of the plurality of base station candidate positions that have the higher scores as the plurality of base station positions, but the present disclosure is not limited thereto.

Figure 4:
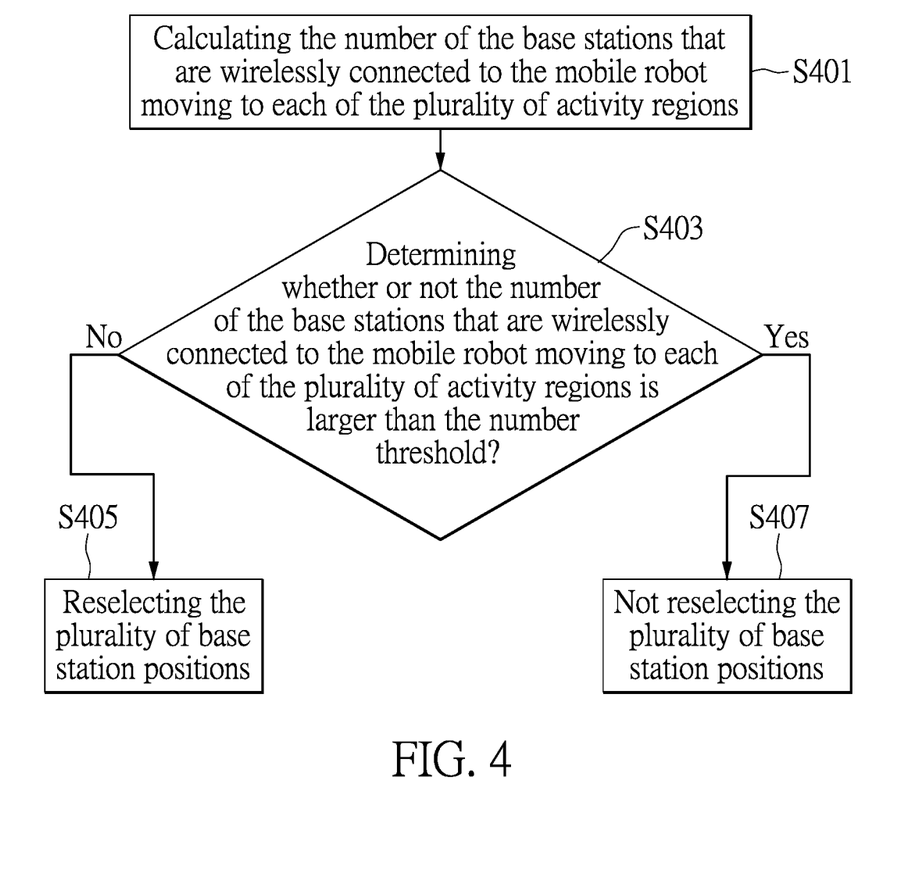
FIG. 4 is a flowchart diagram of steps of the spatial positioning method including determining whether or not the number of the base stations that are wirelessly connected to the mobile robot at the same one of the activity regions is larger than a number threshold to determine whether or not reselecting the base station positions according to the embodiment of the present disclosure.
Figure 7:
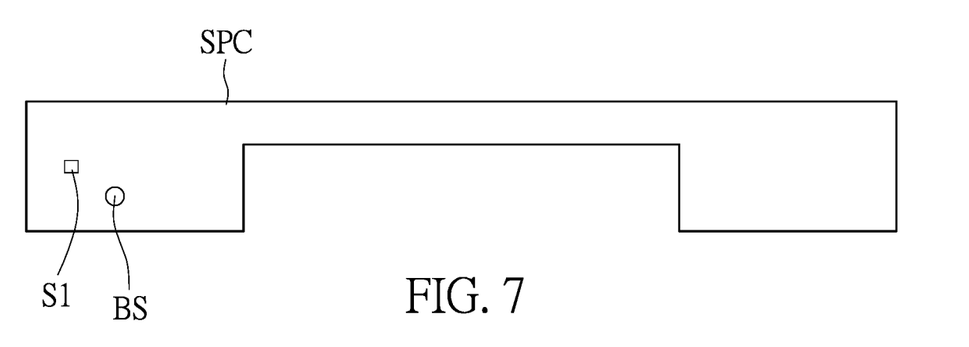
FIG. 7 is a schematic diagram of one of the base stations disposed in the activity regions according to the spatial positioning method of the embodiment of the present disclosure.
Figure 8:
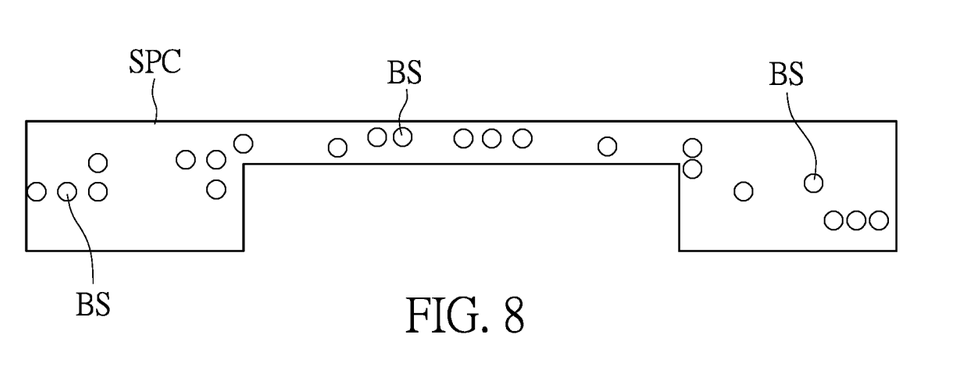
FIG. 8 is a schematic diagram of the base stations disposed in an activity space of the mobile robot according to the spatial positioning method of the embodiment of the present disclosure.

Reference is made to FIGS. 4, 5 to 7, in which FIG. 4 is a flowchart diagram of steps of the spatial positioning method including determining whether or not the number of the base stations that are wirelessly connected to the mobile robot at the same one of the activity regions is larger than a number threshold to determine whether or not to reselect the base station positions according to the spatial positioning method of the embodiment of the present disclosure, FIG. 7 is a schematic diagram of one of the base stations disposed in the activity regions according to the spatial positioning method of the embodiment of the present disclosure, and FIG. 8 is a schematic diagram of the base stations disposed in an activity space of the mobile robot according to the spatial positioning method of the embodiment of the present disclosure.

The spatial positioning method of the embodiment of the present disclosure may include steps S401 to S407 as shown in FIG. 4. The steps S401 to S407 as shown in FIG. 4 may be performed by the spatial positioning system as shown in FIG. 5.

In step S401, the connection state evaluating component 30 calculates the number of the base stations (that are disposed at the base station candidate positions or the selected base station positions X1 to Xm) that are wirelessly connected to the mobile robot moving to each of the plurality of activity regions S1 to Sn.

In step S403, the connection state evaluating component 30 determines whether or not the number of the base stations that are wirelessly connected to the mobile robot moving to each of the plurality of activity regions S1 to Sn is larger than a number threshold such as "3".

If the number of the base stations that are wirelessly connected to the plurality of activity regions S1 to Sn is not larger than the number threshold, which may be caused by a change in the spatial state information of the activity space of the mobile robot or other factors, step S405 is performed. In step S405, the spatial state information may be updated (and the setting and the arithmetic operations of the weight values may be changed) to reselect some of the plurality of base station candidate positions X1 to Xm as the plurality of base positions. Then, the base stations are disposed respectively at the reselected base positions. The number of the base stations disposed at the reselected base positions that are wirelessly connected to the mobile robot moving to each of the plurality of activity regions S1 to Sn is larger than the number threshold. In addition or alternatively, the number of the base station signals that are received from the base stations disposed at the reselected base positions by the mobile robot moving to each of the plurality of activity regions S1 to Sn is larger than the number threshold. Under this condition, the mobile robot can be precisely positioned.

Conversely, if the number of the base stations that are wirelessly connected to the mobile robot moving to each of the plurality of activity regions S1 to Sn or the number of the base station signals that are received from the base stations by the mobile robot moving to each of the plurality of activity regions S1 to Sn is larger than the number threshold, step S407 is performed. In step S407, the selected base positions are kept and not reselected, and the base stations are disposed respectively at the selected base positions.

For example, a distance between each of a plurality of vertex positions of each of the plurality of activity regions (including the activity region S1 as shown in FIG. 7) that are divided from an activity space SPC of the mobile robot and the base station (such as a base station BS as shown in FIG. 7) is smaller than a distance threshold. Under this condition, the mobile robot moving to any one of the plurality of vertex positions of each of the plurality of activity regions (including the activity region S1 as shown in FIG. 7) can receive the base station signal from the base station (such as the base station BS as shown in FIG. 7). If the mobile robot can receive the base station signal from the base station at any one of the plurality of vertex positions such as fourth vertex positions of one of the plurality of activity regions (including the activity region S1 as shown in FIG. 7), the mobile robot moving to any position in the one of the plurality of activity regions can receive the base station signal from the base station (such as the base station BS as shown in FIG. 7).

In another embodiment, the plurality of base stations BS may be distributed in the activity space SPC of the mobile robot as shown in FIG. 8.

It should be understood that, a position of the base station BS as shown in FIG. 7 and distribution of the plurality of base stations BS as shown in FIG. 8 are only exemplified, and the present disclosure is not limited thereto.

In conclusion, the present disclosure provides the spatial positioning method. In the spatial positioning method of the present disclosure, the connection states between the plurality of base stations that are disposed respectively at the plurality of station candidate positions and a mobile robot moving to each of the plurality of activity regions are predicted to select some of the plurality of base station candidate positions as the base station positions. The base stations are disposed are respectively at the selected base station positions. As a result, whenever the mobile robot (e.g., for delivering food) moves to any position in the activity space (in particular, an indoor space in which furnishing that may obstruct signal transmission of the base station signals are arranged), the mobile robot is able to be positioned according to the base station signals by using the spatial positioning method of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A spatial positioning method, comprising the following steps:
   dividing, by a space dividing component, an activity space into a plurality of activity regions, wherein a plurality of base station candidate positions in the activity space or within a distance range of the activity space;
   analyzing, by a spatial state analyzing component, spatial state information of the activity space;
   predicting, by a connection state evaluating component, according to the spatial state information of the activity space, connection states between a plurality of base stations that are assumed to be disposed respectively at some ones of the plurality of station candidate positions and a mobile robot moving to each of the plurality of activity regions, and the connection states between the plurality of base stations that are assumed to be disposed respectively at different ones of the plurality of station candidate positions and the mobile robot moving to each of the plurality of activity regions;
   predicting, by the connection state evaluating component, which ones of the plurality of activity regions are regions at which the mobile robot is wirelessly connected to the base station being disposed at a same one of the plurality of base station candidate positions;
   calculating, by the connection state evaluating component, a number of the plurality of base stations that are wirelessly connected to the mobile robot moving to each of the plurality of activity regions, as a previous connection number of each of the plurality of activity regions;
   setting, by a weight setting component, a plurality of weight values that are respectively correspond to a plurality of reference connection numbers;
   looking up, by a score calculating component, one of the plurality of reference connection numbers that is equal to the previous connection number of each of the plurality of activity regions to obtain one of the plurality of weight values that corresponds to the previous connection number;
   calculating, by the score calculating component, a sum of the weight values of the activity regions at which the base stations are assumed to be respectively disposed and are wirelessly connected to the mobile robot being at the same one of the plurality of station candidate positions, as a score of the same one of the plurality of station candidate positions;
   selecting, by a space positioning component, some of the plurality of base station candidate positions as a plurality of base station positions respectively of the plurality of base stations, according to the plurality of scores respectively of the plurality of station candidate positions; and
   wirelessly connecting to the plurality of base stations of the plurality of base stations that are disposed respectively at the plurality of base station positions, by the mobile robot moving to each of the plurality of activity regions for positioning the mobile robot.

2. The spatial positioning method according to claim 1, further comprising the following step:
   selecting, by the space positioning component, some of the plurality of base station candidate positions that have higher ones of the scores of the plurality of base station candidate positions as the plurality of base station positions.

3. The spatial positioning method according to claim 1, further comprising the following step:
   determining, by the space positioning component, whether or not the score of any one of the plurality of base station candidate positions is larger than a score threshold, in response to determining that the score of the one of the plurality of base station candidate positions is larger than the score threshold, selecting the one of the plurality of base station candidate positions as one of the plurality of base station positions, and in response to determining that the score of the one of the plurality of base station candidate positions is not larger than the score threshold, not selecting the one of the plurality of base station candidate positions as one of the plurality of base station positions.

4. The spatial positioning method according to claim 1, further comprising the following step:
   selecting, by the space positioning component, some of the plurality of base station candidate positions that have higher ones of the scores of the plurality of base station candidate positions as the plurality of base station positions.

5. The spatial positioning method according to claim 1, further comprising the following steps:
   determining whether or not the previous connection number of the mobile robot moving to each of the plurality of activity regions is larger than a number threshold by the connection state evaluating component, in responding to determining that the previous connection number of the mobile robot moving to each of the plurality of activity regions is not larger than the number threshold, reselecting the plurality of base station positions by the space positioning component, and in responding to determining that the previous connection number of the mobile robot moving to each of the plurality of activity regions is larger than the number threshold, not reselecting the plurality of base station positions by the space positioning component.

6. The spatial positioning method according to claim 5, further comprising the following step:
   Setting the number threshold to be larger than three by the connection state evaluating component.

7. The spatial positioning method according to claim 1, further comprising the following steps:
   determining whether or not the previous connection number of the mobile robot moving to each of the plurality of activity regions is larger than a number threshold by the connection state evaluating component, in responding to determining that the previous connection number of the mobile robot moving to each of the plurality of activity regions is not larger than the number threshold, updating the spatial state information of the activity space by the spatial state analyzing component for reselecting the plurality of base station positions according to the spatial state information that is updated, and in responding to determining that the previous connection number of the mobile robot moving to each of the plurality of activity regions is larger than the number threshold, not updating the plurality of base station positions by the spatial state analyzing component.

8. The spatial positioning method according to claim 7, further comprising the following step:
   setting the number threshold to be larger than three by the connection state evaluating component.

* * * * *